(12) United States Patent
Tsubai

(10) Patent No.: US 6,781,821 B2
(45) Date of Patent: Aug. 24, 2004

(54) ELECTRONIC APPARATUS

(75) Inventor: Mitsuo Tsubai, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/279,873

(22) Filed: Oct. 25, 2002

(65) Prior Publication Data

US 2003/0090179 A1 May 15, 2003

(30) Foreign Application Priority Data

Oct. 25, 2001 (JP) ...................................... P2001-327886

(51) Int. Cl.⁷ ................................................. G06F 1/16
(52) U.S. Cl. .................... 361/681; 312/223.2; 345/903; 455/90
(58) Field of Search ................................ 361/679–687, 361/724–727; 312/223.1–223.6; 349/58.73; 345/11, 901, 903, 905; 455/90

(56) References Cited

U.S. PATENT DOCUMENTS 6,445,574 B1 * 9/2002 Saw et al. ................... 361/681
6,462,938 B1 * 10/2002 Horne et al. ................. 361/681
6,550,910 B2 * 4/2003 Hwang ....................... 361/680

FOREIGN PATENT DOCUMENTS

| JP | 7-30261 A | 1/1995 |
| JP | 11-147347 A | 6/1999 |
| JP | 2002-227763 A | 8/2000 |

* cited by examiner

*Primary Examiner*—Hung Van Duong
(74) *Attorney, Agent, or Firm*—Birch, Stewart, Kolasch & Birch, LLP (57) ABSTRACT

An electronic apparatus such as a telephone of the invention includes: a panel unit which is disposed on an upper cabinet portion of the telephone body so as to be angularly displaceable about a rotation axis over an angular range including the predetermined angular position, and which is attachable to and detachable from the telephone body in the state where the panel unit is in the predetermined angular position; and a cabinet cover member which is detachably attached to the upper cabinet portion of the telephone body, and which prevents the panel unit from being detached from the telephone body.

19 Claims, 9 Drawing Sheets

FIG. 10A
AT LARGE TILT ANGLE θ

FIG. 10B
AT SMALL TILT ANGLE θ

ELECTRONIC APPARATUS

This nonprovisional application claims priority under 35 U.S.C. §119 (a) on patent application Ser. No. 2001-327886 filed in JAPAN on Oct. 25, 2001, which is herein incorporated by reference.

BACKGROUND OF THE INVENTION

1. Field of the Invention

The present invention relates to an electronic apparatus such as a telephone, a facsimile apparatus, or a portable terminal, and more particularly to the structure of a tilt mechanism in which a tilt portion provided in an electronic apparatus and capable of being tilted can be attached to and detached from the body of the electronic apparatus.

2. Description of the Related Art

Conventionally, an electronic apparatus having a display unit that is realized by a liquid crystal display device or the like is provided with a tilt mechanism capable of supporting in an angularly displaceable manner the display unit on the body of the electronic apparatus to adjust the unit to an angle at which the user can easily see the unit.

For example, Japanese Unexamined Patent Publication JP-A 7-30261 (1995) discloses a conventional technique of a tilt mechanism for an electronic apparatus. The tilt mechanism is configured so that a projection formed on a case unit serving as a tilt portion is engaged with one of plural through holes formed in a holding wall which is disposed on an upper cover of a telephone body, and which is made of an elastic material, thereby enabling the tilt angle with respect to the telephone body to be held.

Japanese Unexamined Patent Publication JP-A 2000-227763 (2000) discloses another conventional technique of an electronic apparatus. In the electronic apparatus, a display unit serves as a tilt portion, and the tilt angle of the display unit with respect to the apparatus body can be held by angle holding means for maintaining constant a pressing contact force between a sliding rubber member attached to an arcuate or U-shaped part and a sliding face of a printed circuit board constituting a part of a body case unit.

Japanese Unexamined Patent Publication JP-A 11-147347 (1999) discloses a further conventional technique of a case cover. The case cover is configured so that the cover body is continuously joined to the inner side of the case, and, when the cover body is opened from the closed state, the posture of the cover body during the opening and closing operations can be held as far as possible by two pair of connecting rods which are interlockingly operated with the opening and closing operations.

In the conventional techniques disclosed in, for example, JP-A 7-30261 and JP-A 2000-227763, many parts which are separated from the tilt portion and the electronic apparatus body are required. In the case where the tilt portion is to be attached to the apparatus body in a step of producing the electronic apparatus, or where the tilt portion is to be detached from the apparatus body in order to perform maintenance on the electronic apparatus, therefore, a large number of parts must be handled, thereby causing the tilt portion to be hardly attached to and detached from the electronic apparatus body.

The case cover of the conventional technique disclosed in JP-A 11-147347 is suitably used in a copier, a facsimile apparatus, or the like to expose the inner side of the apparatus when the case cover is opened. However, the case cover is not configured so that the cover itself is attachable and detachable. Furthermore, the case cover is not configured so as to allow a display unit and an operation panel disposed on a facsimile apparatus or the like to perform a tilting operation, and also to enable the display unit and the operation panel to be attached and detached.

SUMMARY OF THE INVENTION

Therefore, it is an object of the invention to provide an electronic apparatus in which, when a detachment preventing member is attached to the electronic apparatus, a tilt portion such as a display unit is set to be angularly displaceable to prevent the tilt portion from being detached from the body of the electronic apparatus, and, when the detachment preventing member is detached from the electronic apparatus, the tilt portion is attachable to and detachable from the electronic apparatus body in a state where the tilt portion is in a predetermined angular position.

The invention provides an electronic apparatus comprising:

- an electronic apparatus body;
- a tilt portion disposed on the electronic apparatus body to be angularly displaceable about a rotation axis over an angular range including a predetermined angular position, the tilt portion being attachable to and detachable from the electronic apparatus body in a state where the tilt portion is in the predetermined angular position; and
- a detachment preventing member detachably attached to the electronic apparatus body, for preventing the tilt portion from being detached from the electronic apparatus body.

According to the invention, the tilt portion is disposed on the electronic apparatus body to be angularly displaceable about the rotation axis over the angular range including the predetermined angular position, and is attachable to and detachable from the electronic apparatus body in the state where the tilt portion is in the predetermined angular position, and the detachment preventing member is detachably attached to the electronic apparatus body, and prevents the tilt portion from being detached from the electronic apparatus body. Since this detachment preventing member is attached to the electronic apparatus body, the tilt portion can be prevented from being detached from the electronic apparatus body, while allowing the tilt portion to be angularly displaceable about the rotation axis over the angular range. In the state where the detachment preventing member is detached from the electronic apparatus body and the tilt portion is in the predetermined angular position, the tilt portion can be attached to and detached from the electronic apparatus body.

In this way, in the state where the detachment preventing member is attached to the electronic apparatus body, the tilt portion can be stably angularly displaceable without being detached from the electronic apparatus body. Even in the state where the detachment preventing member is detached from the electronic apparatus body, the tilt portion cannot be detached from the electronic apparatus body in the angular range except the predetermined angular position. Therefore, the fear that, when the tilt portion is angularly displaced, the tilt portion erroneously drops from the electronic apparatus body to be damaged can be reduced as far as possible.

Furthermore, in the invention it is preferable that at least one of the electronic apparatus body and the detachment preventing member has a positioning piece which positions the tilt portion to the predetermined angular position.

According to the invention, since at least one of the electronic apparatus body and the detachment preventing member has the positioning piece which positions the tilt portion to the predetermined angular position, the tilt portion can be easily positioned to the predetermined angular position so that the tilt portion can be quickly attached to and detached from the electronic apparatus body.

Furthermore, in the invention it is preferable that the detachment preventing member has a resilient engagement piece, and is attached to the electronic apparatus body by resiliently engaging the engagement piece with the electronic apparatus body.

According to the invention, since the detachment preventing member has the resilient engagement piece, and is attached to the electronic apparatus body by resiliently engaging the engagement piece with the electronic apparatus body, the detachment preventing member can be surely attached to the electronic apparatus body by the resilient force of the engagement piece. Moreover, the detachment preventing member can be detached from the electronic apparatus body by applying a force against the resilient force of the engagement piece to cancel the engagement between the engagement piece and the electronic apparatus body.

Furthermore, in the invention it is preferable that engagement piece is disposed on one side of the detachment preventing member, and a first latching piece which is to be latched with the electronic apparatus body and a second latching piece which is to be latched with the tilt portion are disposed on another side of the detachment preventing member.

According to the invention, in the detachment preventing member, the engagement piece is disposed on the one side, and the first latching piece which is to be latched with the electronic apparatus body and the second latching piece which is to be latched with the tilt portion are disposed on the other side. According to the configuration, the detachment preventing member is latched to the tilt portion by the second latching piece, the other side of the detachment preventing member is latched to the electronic apparatus body by the first latching piece, and the one side of the detachment preventing member is engaged with the electronic apparatus body by the engagement piece, whereby the detachment preventing member can be attached to the electronic apparatus body and the tilt portion can be prevented from being detached from the electronic apparatus body.

Furthermore, in the invention it is preferable that, in a state where the second latching piece is latched with the tilt portion, the detachment preventing member is angularly displaceable with respect to the electronic apparatus body and the tilt portion between an attachment position where the first latching piece is latched with the electronic apparatus body, and an attachment/detachment operation position where latch of the first latching piece with the electronic apparatus body is cancelled, and, in a state where the detachment preventing member is in the attachment position, the engagement piece is engaged with the electronic apparatus body.

According to the invention, in the state where the second latching piece is latched with the tilt portion, the detachment preventing member is angularly displaceable with respect to the electronic apparatus body and the tilt portion between the attachment position where the first latching piece is latched with the electronic apparatus body, and the attachment/detachment operation position where latch of the first latching piece with the electronic apparatus body is cancelled, and, in the state where the detachment preventing member is in the attachment position, the engagement piece is engaged with the electronic apparatus body. According to the configuration, the second latching piece of the detachment preventing member is latched with the tilt portion, the detachment preventing member is placed in the attachment/detachment operation position, and the detachment preventing member is angularly displaced to be placed in the attachment position, thereby enabling the detachment preventing member to be easily attached to the electronic apparatus body. The detachment preventing member can be easily detached from the electronic apparatus body by angularly displacing the detachment preventing member attached to the electronic apparatus body from the attachment position to the attachment/detachment operation position.

Furthermore, in the invention it is preferable that an angular displacement shaft in which an outer diameter is varied with respect to a circumferential direction is formed on one of the electronic apparatus body and the tilt portion, and a shaft bearing portion is formed on another one of the electronic apparatus body and the tilt portion, the angular displacement shaft being fitted into the shaft bearing portion to be angularly displaceable about the rotation axis, the shaft bearing portion having a cutaway groove of a width which is larger than a minimum outer diameter of the angular displacement shaft and smaller than a maximum outer diameter of the angular displacement shaft, the cutaway groove facing the angular displacement shaft in a direction perpendicular to a direction of the minimum outer diameter in the state where the tilt portion is in the predetermined angular position.

According to the invention, the angular displacement shaft is formed on one of the electronic apparatus body and the tilt portion, the shaft bearing portion is formed on the other one of the electronic apparatus body and the tilt portion, and the angular displacement shaft is fitted into the shaft bearing portion to be angularly displaceable about the rotation axis. Therefore, the tilt portion can be angularly displaced with respect to the electronic apparatus body. The angular displacement shaft is formed so that the outer diameter is varied with respect to the circumferential direction. The shaft bearing portion has the cutaway groove of the width which is larger than the minimum outer diameter of the angular displacement shaft and smaller than the maximum outer diameter of the angular displacement shaft, and is formed so that, in the state where the tilt portion is in the predetermined angular position, the cutaway groove faces the angular displacement shaft in a direction perpendicular to the direction of the minimum outer diameter. In the state where the tilt portion is in the predetermined angular position, therefore, the angular displacement shaft can be fitted into and detached from the shaft bearing portion via the cutaway groove, and, in the state where the tilt portion is not in the predetermined angular position, the angular displacement shaft which is fitted into the shaft bearing portion cannot be detached from the shaft bearing portion. According to the configuration, in the state where the tilt portion is in the predetermined angular position, the tilt portion can be made attachable to and detachable from the electronic apparatus body, and, in the state where the tilt portion is not in the predetermined angular position, the tilt portion cannot be detached from the electronic apparatus body.

Furthermore, in the invention it is preferable that the angular displacement shaft has a cylindrical outer peripheral face having a maximum outer diameter over a predetermined angular range in the circumferential direction, and in the shaft bearing portion, a substantially cylindrical inner peripheral face except the cutaway groove is formed to have an inner diameter which is slightly larger than the maximum outer diameter of the angular displacement shaft.

According to the invention, the angular displacement shaft has the cylindrical outer peripheral face which has the maximum outer diameter over the predetermined angular range in the circumferential direction, and the shaft bearing portion is formed so the substantially cylindrical inner peripheral face except the cutaway groove has the inner diameter which is slightly larger than the maximum outer diameter of the angular displacement shaft. According to the configuration, in a state where the angular displacement shaft is fitted into the shaft bearing portion, the angular displacement shaft can be smoothly angularly displaced about the rotation axis while being supported by the shaft bearing portion. Since the shaft bearing portion can be smoothly angularly displaced about the rotation axis in this way, the tilt portion can be smoothly angularly displaced about the rotation axis.

Furthermore, in the invention it is preferable that the tilt portion is a display unit for displaying predetermined information.

According to the invention, since the tilt portion is a display unit for displaying predetermined information, the operator of the electronic apparatus can angularly displace the display unit to an angle at which information displayed on the display unit can be easily seen. In a process of producing the electronic apparatus, moreover, the work of attaching the display unit to the electronic apparatus body can be conducted easily and quickly, so that the efficiency of production of the electronic apparatus can be improved. In maintenance of the electronic apparatus, the works of attaching and detaching the display unit to and from the electronic apparatus body can be facilitated, so that maintenance can be conducted easily and quickly.

BRIEF DESCRIPTION OF THE DRAWINGS

Other and further objects, features, and advantages of the invention will be more explicit from the following detailed description taken with reference to the drawings wherein:

FIGS. 3A to 3C are section views illustrating a state of attaching the cover member to the upper cabinet portion and a tilting operation of the panel unit, FIG. 3A shows a state where a tilt angle θ is minimum, FIG. 3B shows a state where the tilt angle θ is intermediate between the minimum and the maximum, and FIG. 3C shows a state where the tilt angle θ is maximum;

FIGS. 4A and 4B are enlarged side views showing an angular displacement shaft of the upper cabinet portion and a shaft bearing portion of the panel unit, FIG. 4A shows a state where the tilt angle θ of the panel unit is minimum, and FIG. 4B shows a state where the tilt angle θ of the panel unit is maximum;

FIGS. 6A and 6B are section views illustrating operations of attaching and detaching the cabinet cover member to and from the upper cabinet portion, FIG. 6A shows a state where the cabinet cover member is placed in an attachment/detachment operation position, and FIG. 6B shows a state where the cabinet cover member is placed in an attachment position;

FIGS. 10A and 10B are views illustrating the tilting operation of the panel unit, FIG. 10A shows a state of holding the panel unit in the case where the tilt angle θ is large, and FIG. 10B shows a state of holding the panel unit in the case where the tilt angle θ is small.

DETAILED DESCRIPTION OF THE PREFERRED EMBODIMENTS

Now referring to the drawings, preferred embodiments of the invention are described below.

Figure 1:
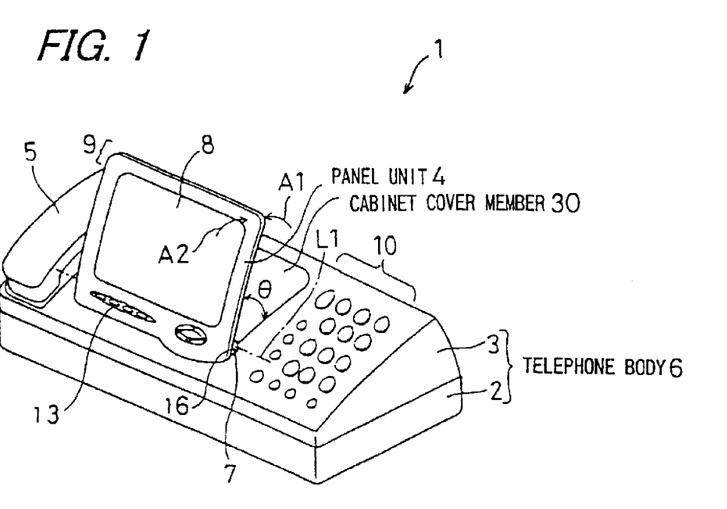
FIG. 1 is a perspective view showing the appearance of a telephone which is an embodiment of the invention, and which has a function of connecting to the Internet.
Figure 2:
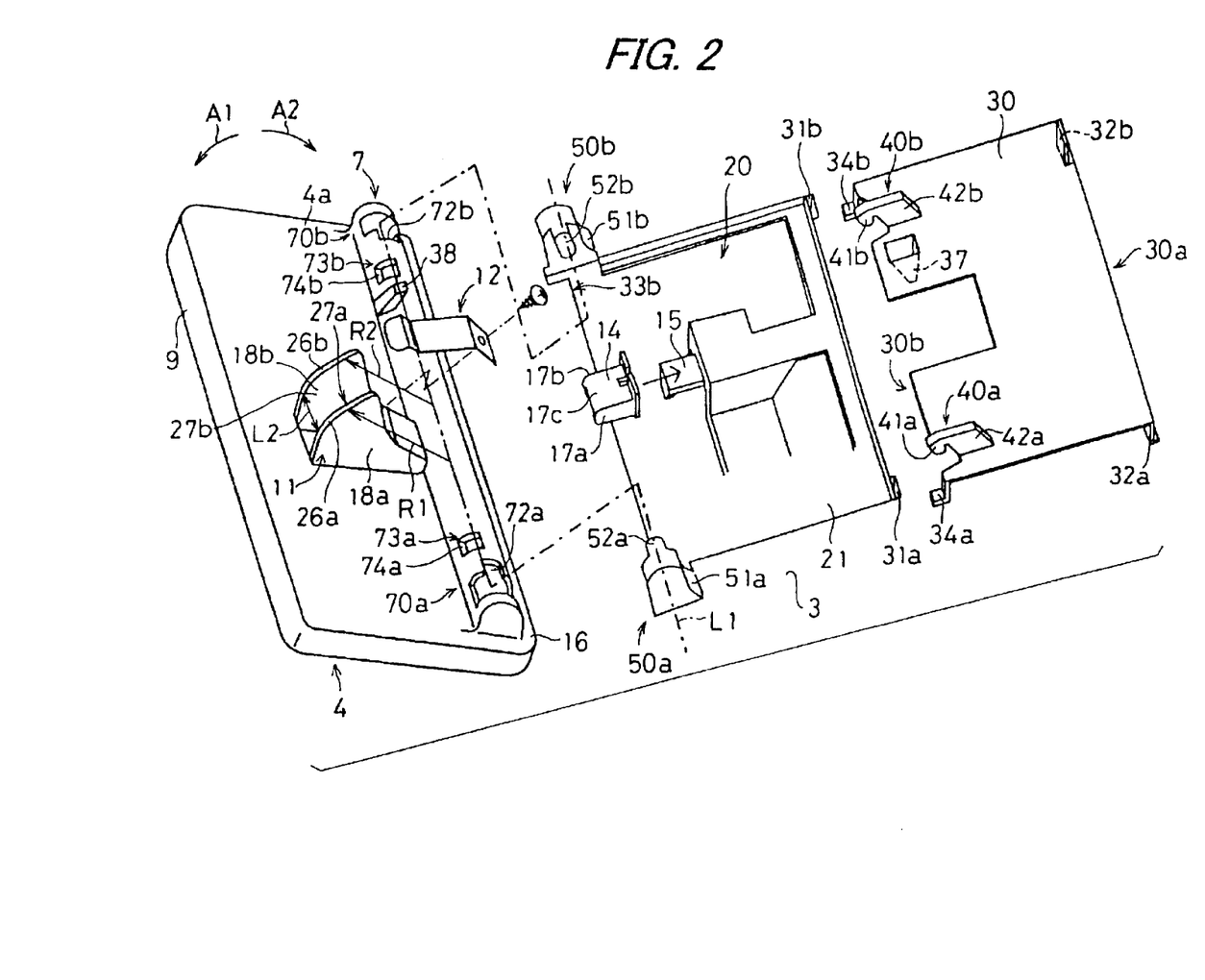
FIG. 2 is an exploded perspective view showing a panel unit as seen from the rear side, the vicinity of a first region which is covered when the panel unit of an upper cabinet portion is closed, and a cabinet cover member.

FIG. 1 is a perspective view showing the appearance of a telephone 1 which is an embodiment of the invention, and which has a function of connecting to the Internet. FIG. 2 is an exploded perspective view showing a panel unit 4 as seen from the rear side, the vicinity of a first region 20 which is covered when the panel unit 4 of an upper cabinet portion 3 is closed, and a cabinet cover member 30. The telephone 1 which serves as an electronic apparatus includes: a lower cabinet portion 2; the upper cabinet portion 3; the panel unit 4 which is disposed on the upper cabinet portion 3, and which is a tilt portion; and a handset 5 which is hooked to one side of the upper cabinet portion 3. The lower cabinet portion 2 and the upper cabinet portion 3 constitute the telephone body 6 which serves as the electronic apparatus body.

The telephone 1 further includes a cabinet cover member (hereinafter, often referred to simply as "cover member") 30 which serves as a detachment preventing member, which is detachably attached to the upper cabinet portion 3, and which prevents the panel unit 4 from being detached from the upper cabinet portion 3. In the upper cabinet portion 3, an opening 21 is formed in the first region 20 to which a rear face portion 4a of the panel unit 4 is opposed in a closed state, i.e., a state where a tilt angle θ is minimum, and the cover member 30 is attached to the upper cabinet portion 3 so as to cover the first region 20 except the opening 21. The rear face portion 4a of the panel unit 4, the upper cabinet portion 3, and the cover member 30 are made of the same synthetic resin. In the first region 20, in addition to the opening 21, a through hole through which a cable for electrically connecting the telephone body 6 with the panel unit 4 is to be passed is formed. The first region 20 is partly covered by the cover member 30 so that dusts are prevented from entering the telephone body 6.

In the panel unit 4, a basal end portion 16 of the rear face portion 4a is disposed on the upper cabinet portion 3 so that the panel unit is made angularly displaceable about a rotation axis L1 elongating in a direction from one side of the upper cabinet portion 3 toward the other side, over an angular range including a predetermined angular position by a shaft bearing latching portion 7. In a state where the panel unit is in a predetermined angular position, the panel unit is attachable to and detachable from the upper cabinet portion 3. In the embodiment, the predetermined angular position is an angular position where the tilt angle θ is maximum, and the angular range is a range in which the tilt angle θ is changed from the minimum to the maximum. When the panel unit 4 is to be opened, a tip end portion 9 of the unit is operated by the fingers of the operator in the direction of the arrow A1, and, when the panel unit is to be closed, the tip end portion is operated in the direction of the arrow A2, whereby a liquid crystal display device 8 disposed on the panel unit 4 can be adjusted to an angle at which the operator can easily see the unit, or the tilt angle θ can be adjusted to the easy-to-see angle, while using the rotation axis L1 as the angular displacement center.

The upper cabinet portion 3 comprises a telephone key inputting portion 10 having a plurality of keys for inputting a telephone number or the like. The panel unit 4 comprises a display key inputting portion 13 having a plurality of keys for selecting or switching a display mode or the like of the liquid crystal display device 8. When a line is connected to the telephone, the panel unit 4 is raised to a desired tilt angle θ, and the operator can then operate the display key inputting portion 13 disposed on the panel unit 4 while seeing information displayed on the liquid crystal display device 8. In this way, convenience in visibility and operability is improved by the disposition of the display key inputting portion 13 and the panel unit 4.

Figure 3A:
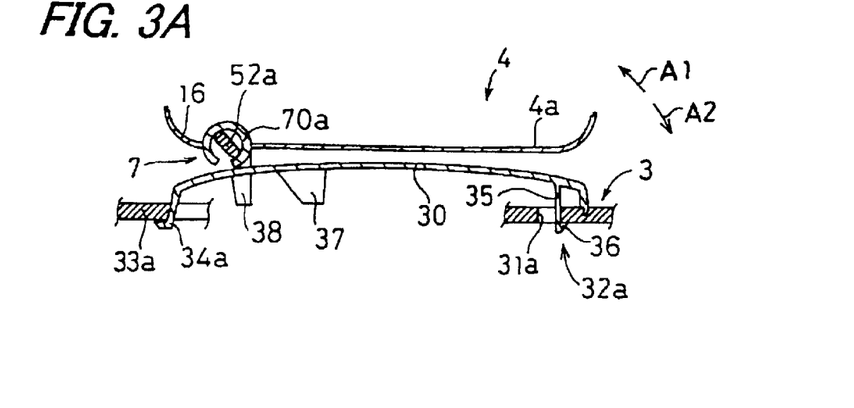
Figure 3B:
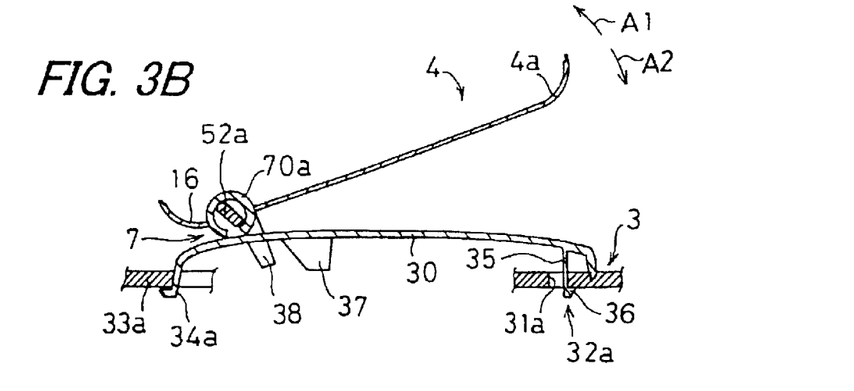
Figure 3C:
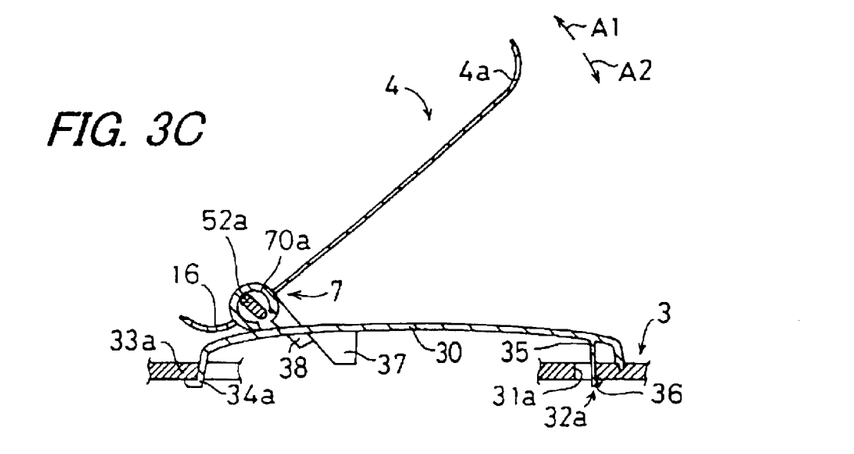
Figure 4A:
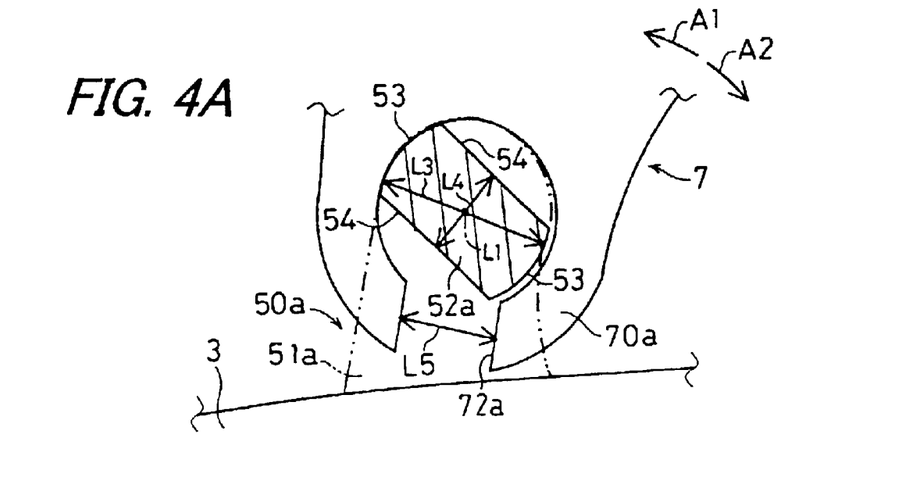
Figure 4B:
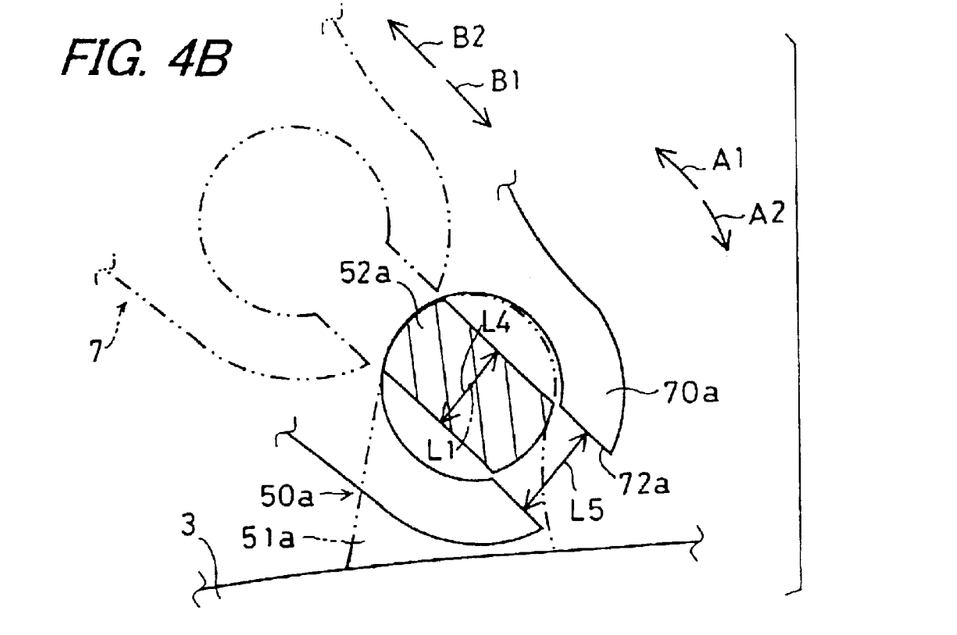

FIGS. 3A to 3C are section views illustrating a state of attaching the cover member 30 to the upper cabinet portion 3 and a tilting operation of the panel unit 4, FIG. 3A shows a state where the tilt angle θ is minimum, FIG. 3B shows a state where the tilt angle θ is intermediate between the minimum and the maximum, and FIG. 3C shows a state where the tilt angle θ is maximum. FIGS. 4A and 4B are enlarged side views showing an angular displacement shaft 52a of the upper cabinet portion 3 and the shaft bearing latching portion 7 of the panel unit 4, FIG. 4A shows a state where the tilt angle θ of the panel unit 4 is minimum, and FIG. 4B shows a state where the tilt angle θ of the panel unit 4 is maximum.

In the first region 20 of the upper cabinet portion 3, a pair of pivot portions 50a and 50b are disposed on the side of the front face of the telephone body 6, and in predetermined places which are close to one side and the other side of the upper cabinet portion 3, respectively (see FIG. 2). The pivot portions 50a and 50b are molded integrally with the upper cabinet portion 3. The first pivot portion 50a which is disposed in the vicinity of the other side of the upper cabinet portion 3 has: a shaft basal portion 51a which protrudes in a direction from the upper cabinet portion 3 toward the outside of the telephone body 6; and the angular displacement shaft 52a which protrudes along the rotation axis L1 from a free end of the shaft basal portion 51a and in a direction from the other side of the upper cabinet portion 3 to the one side. The second pivot portion 50b which is disposed in the vicinity of the one side of the upper cabinet portion 3 has: a shaft basal portion 51b which protrudes in a direction from the upper cabinet portion 3 toward the outside of the telephone body 6; and an angular displacement shaft 52b which protrudes along the rotation axis L1 from a free end of the shaft basal portion 51b and in a direction from the one side of the upper cabinet portion 3 to the other side.

The angular displacement shafts 52a and 52b of the first and second pivot portions 50a and 50b are formed so that the outer diameter is varied with respect to the circumferential direction, and a section perpendicular to the rotation axis L1 has an elliptical shape. Since the angular displacement shafts 52a and 52b have the same shape, only the angular displacement shaft 52a of the first pivot portion 50a will be described in detail. As shown in FIG. 4, the angular displacement shaft 52a has: a cylindrical face portion 53 in which the outer diameter centered on the rotation axis L1 is L3 over a predetermined angular range in the circumferential direction; and a flat portion 54 having parallel planar faces which are continuous to the outer peripheral face of the cylindrical face portion 53, and which extends in parallel with the rotation axis L1. The flat portion 54 has a dimension of L4 in the thickness direction. The cylindrical face portion 53 is formed so that the outer diameter L3 is larger than the dimension L4 of the flat portion 54 in the thickness direction. In the angular displacement shafts 52a and 52b, therefore, the maximum outer diameter is L3, and the minimum outer diameter is L4.

The shaft bearing latching portion 7 is molded integrally with the panel unit 4. In the shaft bearing latching portion 7, a pair of shaft bearing portions 70a and 70b are formed into which the angular displacement shafts 52a and 52b of the first and second pivot portions 50a and 50b are to be fitted so as to be angularly displaceable about the rotation axis L1, respectively. The shaft bearing portions 70a and 70b respectively have cutaway grooves 72a and 72b of a width L5 which is larger than the minimum outer diameter L4 of the angular displacement shafts 52a and 52b, and smaller than the maximum outer diameter L3. The cutaway grooves 72a and 72b are formed so that, in a state where the panel unit 4 is in an angular position of the maximum tilt angle θ as shown in FIG. 4B, the grooves face the angular displacement shafts 52a and 52b in directions (the directions of the arrows B1 and B2 in FIG. 4B) perpendicular to the minimum outer diameter direction, respectively.

In the shaft bearing portions 70a and 70b, a substantially cylindrical inner peripheral face except the cutaway grooves 72a and 72b is formed so as to have an inner diameter which is slightly larger than the maximum outer diameter L3 of the angular displacement shafts 52a and 52b. The slightly larger inner diameter is an inner diameter which, in a state where the angular displacement shafts 52a and 52b are respectively fitted into the shaft bearing portions 70a and 70b to attach the panel unit 4 to the upper cabinet portion 3, allows the panel unit 4 to be pivoted so as to be easily angularly displaceable in the directions of the arrows A1 and A2.

When the tilt angle θ of the panel unit 4 is made maximum in a state where the cover member 30 is not attached to the upper cabinet portion 3, as shown in FIGS. 3C and 4B, the cutaway grooves 72a and 72b face the angular displacement shafts 52a and 52b in the directions B1 and B2 perpendicular to the minimum outer diameter direction. Therefore, the panel unit 4 can be attached to and detached from the upper cabinet portion 3 by displacing the panel unit 4 in the directions B1 and B2 perpendicular to the minimum outer diameter direction (the direction of L4) of the angular displacement shafts 52a and 52b. The angular displacement shafts 52a and 52b are set so that the directions perpendicular to the minimum outer diameter direction coincide with an obliquely upward direction which is oriented to the upward and the front of the telephone body 6. According to the configuration, when the panel unit 4 is to be attached to or detached from the upper cabinet portion 3, the directions B1 and B2 coincide with an obliquely upward direction which is oriented to the upward and the front of the telephone body 6, and hence the attaching or detaching work can be easily conducted.

As described above, the angular displacement shafts 52a and 52b are formed on the upper cabinet portion 3, and the shaft bearing portions 70a and 70b are fitted into the basal end portion 16 of the rear face portion 4a of the panel unit 4 so that the angular displacement shafts 52a and 52b are angularly displaceable about the rotation axis L1. Therefore, the panel unit 4 can be angularly displaced with respect to the telephone body 6. Furthermore, the angular displacement shafts 52a and 52b are formed so that the outer diameter is varied with respect to the circumferential direction, the shaft bearing portions 70a and 70b have the cutaway grooves 72a and 72b of the width L5 which is larger than the minimum outer diameter L4 of the angular displacement shafts 52a and 52b, and smaller than the maximum outer diameter L3, and the cutaway grooves 72a and 72b are formed so that, in the state where the panel unit 4 is in the angular position of the maximum tilt angle θ, the cutaway grooves 72a and 72b face the angular displacement shafts 52a and 52b in the direction perpendicular to the minimum outer diameter direction. In a state where the panel unit 4 is in the angular position, therefore, the angular displacement shafts 52a and 52b can be respectively attached to and detached from the shaft bearing portions 70a and 70b via the cutaway grooves 72a and 72b. And, in a state where the panel unit 4 is not in the angular position, the angular displacement shafts 52a and 52b which are fitted into the shaft bearing portions 70a and 70b cannot be detached from the shaft bearing portions 70a and 70b, respectively. According to the configuration, in the state where the panel unit 4 is in the angular position, the panel unit 4 can be made attachable to and detachable from the telephone body 6, and, in the state where the panel unit 4 is not in the angular position, can be made undetachable from the telephone body 6.

The angular displacement shafts 52a and 52b have the cylindrical outer peripheral face which has the maximum outer diameter L3 over the predetermined angular range in the circumferential direction, and the shaft bearing portions 70a and 70b have the substantially cylindrical inner peripheral face except the cutaway grooves 72a and 72b which is formed so as to have the inner diameter that is slightly larger than the maximum outer diameter L3 of the angular displacement shafts 52a and 52b. According to the configuration, in a state where the angular displacement shafts 52a and 52b are fitted into the shaft bearing portions 70a and 70b, the angular displacement shafts 52a and 52b can be smoothly angularly displaced about the rotation axis L1 while being supported by the shaft bearing portions 70a and 70b. Since the angular displacement shafts 52a and 52b can be smoothly angularly displaced about the rotation axis L1 in this way, the panel unit 4 can be smoothly angularly displaced about the rotation axis L1.

As shown in FIGS. 3A to 3C, the cover member 30 have: cover engagement pieces 32a and 32b serving as resilient engagement pieces which are to be engaged with cover engaging holes 31a and 31b formed in the upper cabinet portion 3, respectively; and cover latching pieces 34a and 34b serving as first latching pieces which are to be latched with cover latching portions 33a and 33b formed in the upper cabinet portion 3. The cover engagement pieces 32a and 32b, and the cover latching pieces 34a and 34b are molded integrally with the cover member 30.

The first cover engagement piece 32a is disposed in a predetermined place of the cover member 30 which, in the state where the cover member 30 is attached to the upper cabinet portion 3, is close to the back face of the telephone body 6 and the other side of the upper cabinet portion 3. The second cover engagement piece 32b is disposed in a predetermined place of the cover member 30 which, in the state where the cover member 30 is attached to the upper cabinet portion 3, is close to the back face of the telephone body 6 and the one side of the upper cabinet portion 3. The cover engagement pieces 32a and 32b have a substantially L-like section shape which is perpendicular to a direction from the other side of the upper cabinet portion 3 to the one side, and which has: a resilient portion 35 that, in the state where the cover member 30 is attached to the upper cabinet portion 3, protrudes toward the inner side of the telephone body 6; and an engagement portion 36 which protrudes from a free end of the resilient portion toward the back face portion of the telephone body 6.

The first cover latching piece 34a is disposed in a predetermined place of the cover member 30 which, in the state where the cover member 30 is attached to the upper cabinet portion 3, is close to the front face of the telephone body 6 and the other side of the upper cabinet portion 3. The second cover latching piece 34b is disposed in a predetermined place of the cover member 30 which, in the state where the cover member 30 is attached to the upper cabinet portion 3, is close to the front face of the telephone body 6 and the one side of the upper cabinet portion 3. The cover latching pieces 34a and 34b have a substantially L-like section shape which is perpendicular to a direction from the one side of the upper cabinet portion 3 to the other side, and which, in the state where the cover member 30 is attached to the upper cabinet portion 3, protrudes toward the inner side of the telephone body 6 and is bent toward the front face of the telephone body 6.

The cover latching pieces 34a and 34b are latched with the cover latching portions 33a and 33b, and the cover engagement pieces 32a and 32b are inserted into the cover engaging holes 31a and 31b, respectively, whereby the cover engagement pieces 32a and 32b are resiliently engaged with the upper cabinet portion 3, so that the cover member 30 is attached to the upper cabinet portion 3.

As described above, the cover member 30 has the resilient cover engagement pieces 32a and 32b, and the cover engagement pieces 32a and 32b are resiliently engaged with the upper cabinet portion 3, so that the cover member 30 is attached to the upper cabinet portion 3. Therefore, the cover member 30 can be surely attached to the upper cabinet portion 3 by the resilient forces of the cover engagement pieces 32a and 32b. Moreover, the cover member 30 can be detached from the upper cabinet portion 3 by applying a force against the resilient forces of the cover engagement pieces 32a and 32b to the cover engagement pieces 32a and 32b to cancel the engagement between the cover engagement pieces 32a and 32b and the upper cabinet portion 3.

Figure 5:
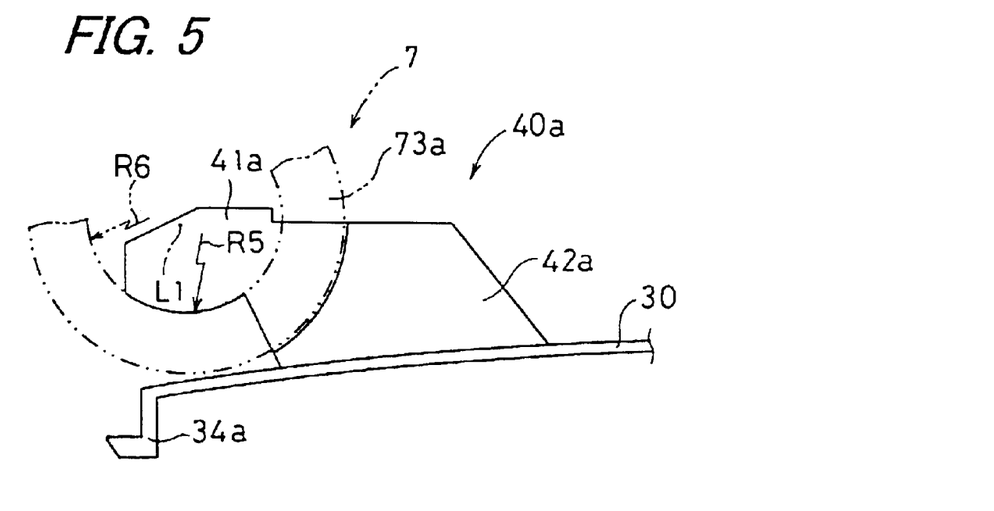
FIG. 5 is a side view showing a first panel unit latching piece.
Figure 6A:
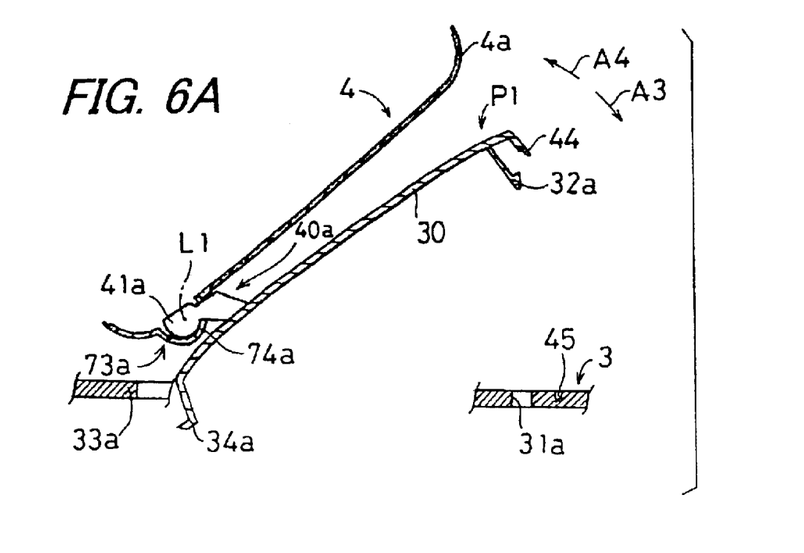
Figure 6B:
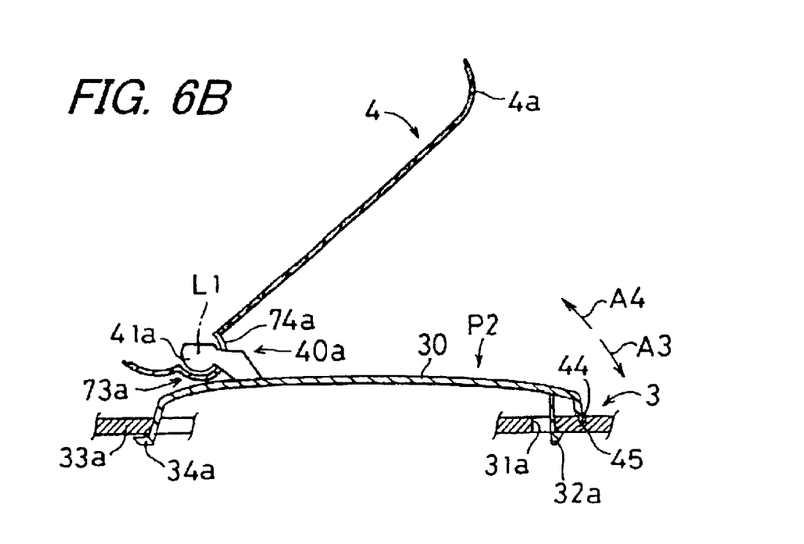

FIG. 5 is a side view showing a first panel unit latching piece 40a. FIGS. 6A and 6B are section views illustrating operations of attaching and detaching the cabinet cover member 30 to and from the upper cabinet portion 3, FIG. 6A shows a state where the cabinet cover member 30 is placed in an attachment/detachment operation position P1, and FIG. 6B shows a state where the cabinet cover member 30 is placed in an attachment position P2. The cover member 30 has a pair of panel unit latching pieces (hereinafter, often referred to simply as "panel latching pieces") 40a and 40b serving as second latching pieces which are to be latched with the panel unit 4. The panel latching pieces 40a and 40b are molded integrally with the cover member 30.

As shown in FIG. 2, the first panel latching piece 40a has: an engagement basal portion 42a which, in the state where the cover member 30 is attached to the upper cabinet portion 3, protrudes in a direction oriented to the outside of the telephone body 6, in a predetermined place which is in the vicinity of the first cover latching piece 34a and close to the second cover latching piece 34b; and a latching end portion 41a which protrudes from a free end portion of the engagement basal portion 42a in a direction oriented to the front face of the telephone body 6. As shown in FIG. 2, the second panel latching piece 40b has: an engagement basal portion 42b which, in the state where the cover member 30 is attached to the upper cabinet portion 3, protrudes in a direction oriented to the outside of the telephone body 6, in a predetermined place which is in the vicinity of the second cover latching piece 34b and close to the first cover latching piece 34a; and a latching end portion 41b which protrudes from a free end portion of the engagement basal portion 42b in a direction oriented to the front face of the telephone body 6. In the state where the cover member 30 is attached to the upper cabinet portion 3, at least places of the latching end portions 41a and 41b of the panel latching pieces 40a and 40b are formed into a cylindrical shape in which the rotation axis L1 is used as the axis, the places facing the inner side of the telephone body 6.

In the shaft bearing latching portion 7 of the panel unit 4, formed are a pair of latching portions 73a and 73b into which at least the latching end portions 41a and 41b of the panel latching pieces 40a and 40b are to be fitted so as to be angularly displaceable about the rotation axis L1. The latching portions 73a and 73b have through holes 74a and 74b through which at least the latching end portions 41a and 41b of the panel latching pieces 40a and 40b can be passed, respectively. The regions of the latching portions 73a and 73b except the through holes 74a and 74b have a substantially cylindrical shape, and are formed so that the radii of curvature R6 of the inner peripheral faces of the regions are slightly larger than the radii of curvature R5 of the outer peripheral faces of the latching end portions 41a and 41b of the panel latching pieces 40a and 40b.

As shown in FIGS. 6A and 6B, in a state where the panel latching pieces 40a and 40b are latched with the latching portions 73a and 73b of the panel unit 4, the cover member 30 is angularly displaceable about the rotation axis L1 with respect to the upper cabinet portion 3 and the panel unit 4, between the attachment/detachment operation position P1 where the engagement of the cover latching pieces 34a and 34b with the cover latching portions 33a and 33b of the upper cabinet portion 3 is cancelled, and the attachment position P2 where the cover latching pieces 34a and 34b are latched with the cover latching portions 33a and 33b of the upper cabinet portion 3. In a state where the cover member 30 is in the attachment position P2, the cover engagement pieces 32a and 32b are engaged with the cover engaging holes 31a and 31b of the upper cabinet portion 3, respectively.

When the panel latching pieces 40a and 40b of the cover member 30 are to be latched with the latching portions 73a and 73b of the panel unit 4, the panel latching pieces 40a and 40b of the cover member 30 are passed respectively through the through holes 74a and 74b of the latching portions 73a and 73b of the panel unit 4 to cause the latching end portions 41a and 41b to butt against the inner peripheral faces of the latching portions 73a and 73b, as shown in FIG. 6A. As a result, the cover member 30 is placed in the attachment/detachment operation position P1. Next, in the state where the latching end portions 41a and 41b butt against the inner peripheral faces of the latching portions 73a and 73b, the cover engagement pieces 32a and 32b of the cover member 30 are displaced in a direction A3 along which the cover engagement pieces are made close to the upper cabinet portion 3. At this time, the cover member 30 is angularly displaced about the rotation axis L1.

The cover engagement pieces 32a and 32b of the cover member 30 are further displaced in the direction A3 along which the cover engagement pieces are made close to the upper cabinet portion 3, so that, as shown in FIG. 6B, the cover engagement pieces 32a and 32b are passed through the cover engaging holes 31a and 31b of the upper cabinet portion 3 to be engaged therewith, respectively. At this time, the cover latching pieces 34a and 34b are latched with the cover latching portions 33a and 33b of the upper cabinet portion 3, and the cover member 30 is placed in the attachment position P2.

As described above, the panel unit 4 is disposed on the telephone body 6 so as to be angularly displaceable about the rotation axis L1 over the angular range including the predetermined angular position, and attachable to and detachable from the telephone body in the state where the unit is in the predetermined angular position, i.e., the angular position where the tilt angle θ is maximum, and the cover member 30 is detachably attached to the telephone body 6, and prevents the panel unit 4 from being detached from the telephone body 6. When such the cover member 30 is attached to the telephone body 6, the panel unit 4 can be prevented from being detached from the telephone body 6, while allowing the panel unit 4 to be angularly displaceable about the rotation axis L1 over the angular range. In the state where the cover member 30 is detached from the telephone body 6 and the panel unit 4 is in the angular position where the tilt angle θ is maximum, the panel unit 4 can be attached to and detached from the telephone body 6.

In the state where the cover member 30 is attached to the telephone body 6 in this way, the panel unit 4 can be stably angularly displaced without being detached from the telephone body 6. Even in the state where the cover member 30 is detached from the telephone body 6, the panel unit 4 cannot be detached from the telephone body 6 in the angular range except the angular position where the tilt angle θ is maximum. Therefore, the fear that, when the panel unit 4 is angularly displaced, the panel unit 4 erroneously drops from the telephone body 6 to be damaged can be reduced as far as possible.

In the state where the panel latching pieces 40a and 40b are latched with the latching portions 73a and 73b of the panel unit 4, the cover member 30 is angularly displaceable with respect to the upper cabinet portion 3 and the panel unit 4, between the attachment position P2 where the cover latching pieces 34a and 34b are latched with the cover latching portions 33a and 33b of the upper cabinet portion 3, and the attachment/detachment operation position P1 where the engagement of the cover latching pieces 34a and 34b with the cover latching portions 33a and 33b of the upper cabinet portion 3 is cancelled. In the state where the cover member is in the attachment position P2, the cover engagement pieces 32a and 32b are engaged with the cover engaging holes 31a and 31b of the upper cabinet portion 3. According to the configuration, the cover member 30 can be easily attached to the upper cabinet portion 3 by latching the panel latching pieces 40a and 40b of the cover member 30 with the latching portions 73a and 73b of the panel unit 4, placing the cover member 30 in the attachment/detachment operation position P1, and then angularly displacing the cover member 30 to be placed in the attachment position P2. Furthermore, the cover member 30 attached to the upper cabinet portion 3 can be easily detached from the upper cabinet portion 3 by angularly displacing the cover member 30, from the attachment position P2 to the attachment/detachment operation position P1.

In the cover member 30, the cover engagement pieces 32a and 32b are disposed in the predetermined place of the cover member 30 which, in the state where the cover member 30 is attached to the upper cabinet portion 3, is close to the back face of the telephone body 6, and the cover latching pieces 34a and 34b and the panel latching pieces 40a and 40b are disposed in the predetermined place of the cover member 30 which is close to the front face of the telephone body 6. According to the configuration, the cover member 30 can be attached to the upper cabinet portion 3 and the panel unit 4 can be prevented from being detached from the telephone body 6 by latching the cover member 30 with the latching portions 73a and 73b of the panel unit 4 by the panel latching pieces 40a and 40b, latching the cover member 30 with the upper cabinet portion 3 by the cover latching pieces 34a and 34b, and engaging the cover member with the upper cabinet portion 3 by the cover latching portions 32a and 32b.

The telephone may be configured in the following manner. In the cover member 30, as shown in FIG. 6, an auxiliary member 44 which, in the state where the cover member 30 is attached to the upper cabinet portion 3, protrudes beyond the cover engagement pieces 32a and 32b of the cover member 30 in a direction oriented to the back face of the telephone body 6 and is then bent in a direction oriented to the inner side of the telephone body 6, and an auxiliary recess 45 into which the auxiliary member 44 can be fitted is disposed in a position of the upper cabinet portion 3 which is closer to the back face of the telephone body 6 than the cover engaging holes 31a and 31b. In the state where the cover member 30 is attached to the upper cabinet portion 3, the auxiliary member 44 is fitted into the auxiliary recess 45. According to the configuration, in the state where the cover member 30 is attached to the upper cabinet portion 3, the cover member 30 can be surely prevented from being displaced in directions oriented to the front face and the back face of the telephone body 6, whereby the attaching state can be stabilized, and a situation can be prevented from occurring in which the operator erroneously touches the cover engagement pieces 32a and 32b to cancel the engagement of the cover engagement pieces 32a and 32b with the cover engaging holes 31a and 31b, and the cover member 30 is detached from the upper cabinet portion 3.

The cover latching pieces 34a and 34b of the cover member 30 may have a shape in which, in the state where the cover member 30 is attached to the upper cabinet portion 3, the pieces protrude in an obliquely downward direction oriented to the inner side and the front face of the telephone body 6, and are then bent toward the front face of the telephone body 6. In the state where the cover member 30 is attached to the upper cabinet portion 3, a force which is directed from the back face of the telephone body 6 to the front face is applied to the cover member 30 by the resilient forces of the cover engagement pieces 32a and 32b. Therefore, the cover latching pieces 34a and 34b are caused by the forces to slip into the telephone body 6 to be latched with the cover latching portions 33a and 33b. As a result, the panel latching pieces 40a and 40b of the cover member 30 press the latching portions 73a and 73b of the panel unit 4 in a direction oriented to the inner side of the telephone body 6. When the panel unit 4 is angularly displaced, particularly when the panel unit 4 is in the vicinity of the angular position where the tilt angle θ is maximum, therefore, the panel unit 4 is prevented from being displaced in the minimum outer diameter direction of the angular displacement shafts 52a and 52b, so that the panel unit 4 can be smoothly angularly displaced.

As shown in FIG. 3, the cover member 30 has a positioning portion 37 serving as a positioning piece which positions the panel unit 4 to the predetermined angular position, i.e., the angular position (see FIG. 3C) where the tilt angle θ is maximum. The positioning portion 37 is molded integrally with the cover member 30 so as to, in the state where the cover member 30 is attached to the upper cabinet portion 3, protrude from a predetermined place which is close to both the faces of the telephone body 6 and also to the one side of the upper cabinet portion 3, in a direction oriented to the inner side of the telephone body 6.

The panel unit 4 has a positioning piece 38 which positions the panel unit 4 to the predetermined angular position, i.e., the angular position where the tilt angle θ is maximum. The positioning piece 38 is molded integrally with the panel unit 4 so as to, in the state (see FIG. 3A) where the panel unit 4 is attached to the upper cabinet portion 3 and the tilt angle θ is minimum, protrude to the inner side of the telephone body 6 beyond the cover member 30, and, in the state (see FIG. 3C) where the tilt angle θ is maximum, protrude from a predetermined place of the basal end portion 16 of the rear face portion 4a of the panel unit 4 in a direction oriented to the outer side of the panel unit 4 while butting against the positioning portion 37 of the cover member 30. The cover member 30 and the upper cabinet portion 3 are structured so as not to contact with the positioning piece 38 until the tilt angle θ of the panel unit 4 is increased from the minimum state to the maximum state so that the positioning piece 38 butts against the positioning portion 37.

As described above, the cover member 30 and the panel unit 4 respectively have the positioning portion 37 and the positioning piece 38 which are used for positioning the panel unit 4 to the angular position where the tilt angle θ maximum. Therefore, the panel unit 4 can be easily positioned to the angular position so that the panel unit 4 can be quickly attached to and detached from the telephone body 6. Alternatively, the positioning portion 37 may be configured so as to be disposed on the upper cabinet portion 3.

The pivot portions 50a and 50b having the angular displacement shafts 52a and 52b are disposed on the upper cabinet portion 3 so as to protrude in a direction oriented to the outer side of the telephone body 6. As compared with a case where, for example, the pivot portions are disposed on the upper cabinet portion 3 so as to be depressed toward the inner side of the telephone body 6, therefore, the panel unit 4 can be more easily placed so that, when the panel unit 4 is to be attached to the upper cabinet portion 3, the cutaway grooves 72a and 72b of the panel unit 4 face the angular displacement shafts 52a and 52b of the pivot portions 50a and 50b in a direction perpendicular to the minimum outer diameter direction, and the works of attaching and detaching the panel unit 4 to and from the telephone body 6 can be conducted more easily and quickly.

The pivot portions 50a and 50b are molded integrally with the upper cabinet portion 3. As compared with a case where the angular displacement shafts 52a and 52b are formed separately from the upper cabinet portion 3, therefore, the number of parts of the telephone 1 can be reduced, and moreover the steps of attaching and detaching the angular displacement shafts which are formed as separate parts, to and from the upper cabinet portion 3 and the panel unit 4 can be omitted. As a result, the step of attaching the panel unit 4 to the telephone body 6 can be quickly conducted in a simplified manner.

Figure 7:
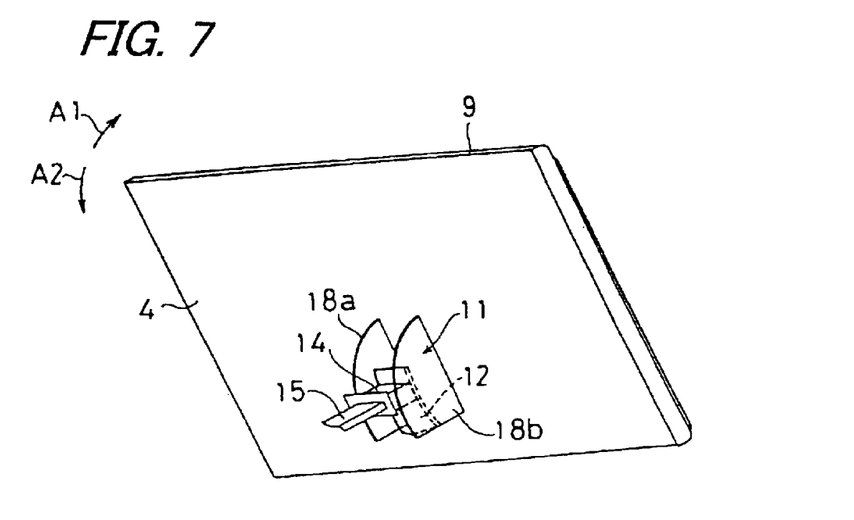
FIG. 7 is a perspective view showing a rear face portion of the panel unit.
Figure 8:
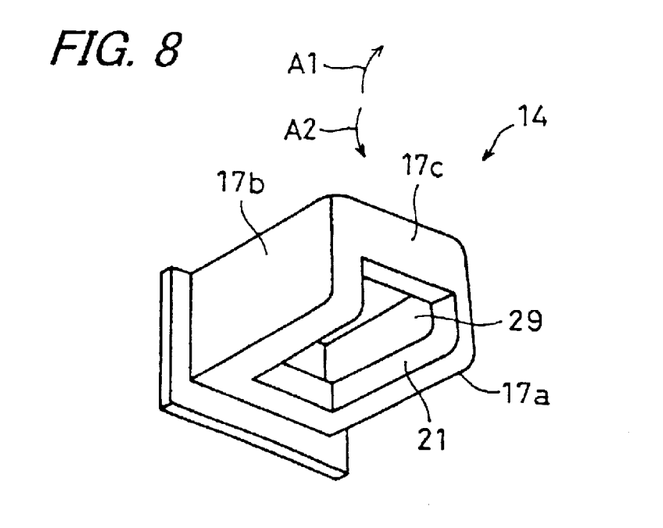
FIG. 8 is a perspective view of a friction member as seen obliquely from the lower side.
Figure 9:
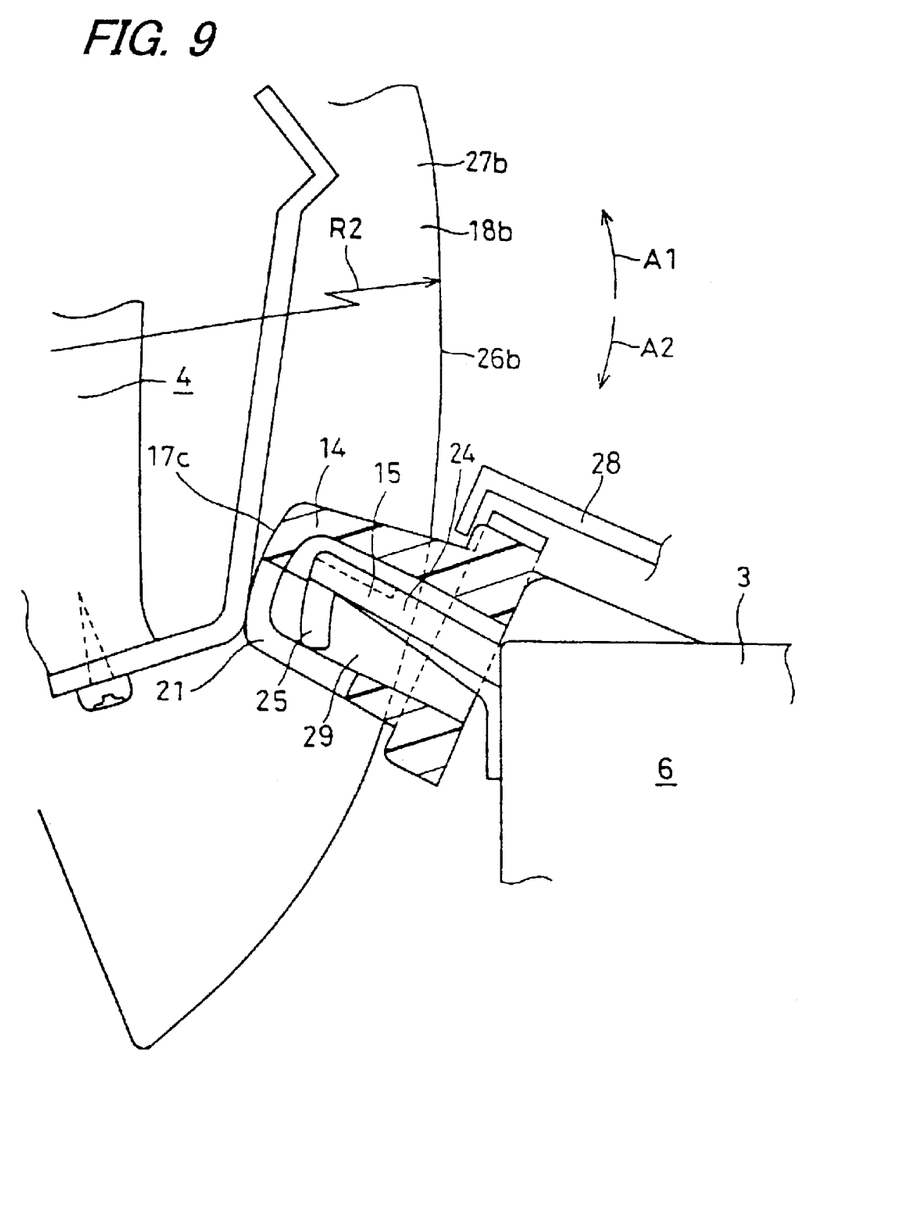
FIG. 9 is an enlarged section view of the vicinity of the friction member.

FIG. 7 is a perspective view showing the rear face portion 4a of the panel unit 4, FIG. 8 is a perspective view of a friction member 14 as seen obliquely from the lower side, and FIG. 9 is an enlarged section view of the vicinity of the friction member 14. As a configuration for giving an optimum tilt holding force to the panel unit 4, the telephone 1 includes: an attachment portion 15 which, in the state where the panel unit 4 is attached to the upper cabinet portion 3, protrudes from the upper cabinet portion 3 so as to face the panel unit 4; the friction member 14 which is made of silicone rubber that is a flexible and resilient material, and which is detachably attached to the attachment portion 15; and two slidingly contacting members 11 and 12 which are disposed on the rear face portion 4a of the panel unit 4 facing the attachment portion 15, and which slidingly contact with the friction member 14 over the angular displacement range of the panel unit 4.

The first slidingly contacting member 11 is configured by a pair of plate-like members 18a and 18b which slidingly contact with sides 17a and 17b of the friction member 14 over the angular displacement range of the panel unit 4, respectively. The second slidingly contacting member 12 is a plate spring which resiliently presses a free end 17c of the friction member 14 over the angular displacement range of the panel unit 4.

The plate-like members 18a and 18b of the first slidingly contacting member 11 slidingly contact with the sides 17a and 17b of the friction member 14 over the angular displacement range of the panel unit 4, respectively. In the plate-like members, the contact area with respect to the sides 17a and 17b of the friction member 14 is more reduced as the panel unit 4 is further angularly displaced with respect to the telephone body 6 in the opening direction A1, and is more increased as the panel unit 4 is further angularly displaced with respect to the telephone body 6 in the closing direction A2. The second slidingly contacting member 12 resiliently presses the free end 17c of the friction member 14 over the angular displacement range of the panel unit 4. The attachment portion 15 is disposed so as to be exposed to the outside through the opening 21 of the upper cabinet portion 3.

The attachment portion 15 has: a projection 24 which is to be inserted into the friction member 14; and a latching portion 25 which is integrally formed with being downward (toward the lower side of FIG. 9) bent from a tip end of the projection 24. In the friction member 14, an insertion hole 29 through which the latching portion 25 can be passed is formed so as to be downward opened through the opening 21, thereby preventing the friction member 14 from dropping from the attachment portion 15. A rib 28 is disposed above the center of the root of the attachment portion 15, in order to prevent dropping from occurring when the friction member 14 is elastically deformed in the angular displacement direction A1 or A2 by a sliding friction force in the angular displacement of the panel unit 4 in the direction of the arrow A1 or A2.

Figure 10A:
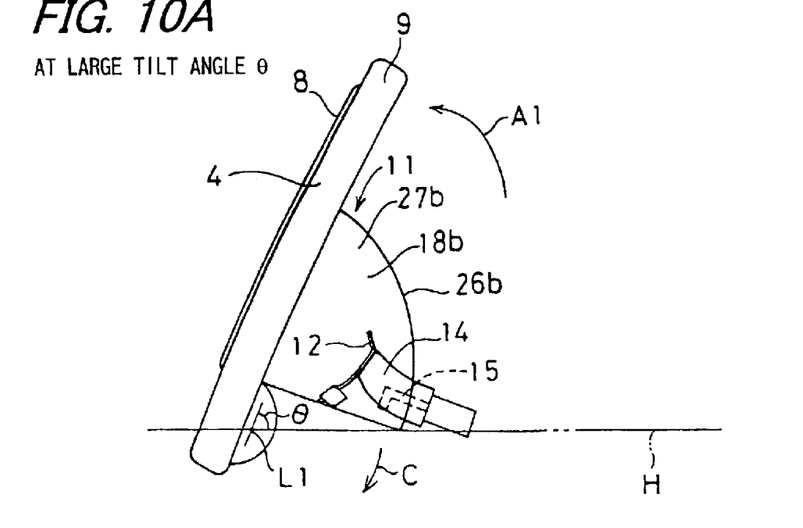
Figure 10B:
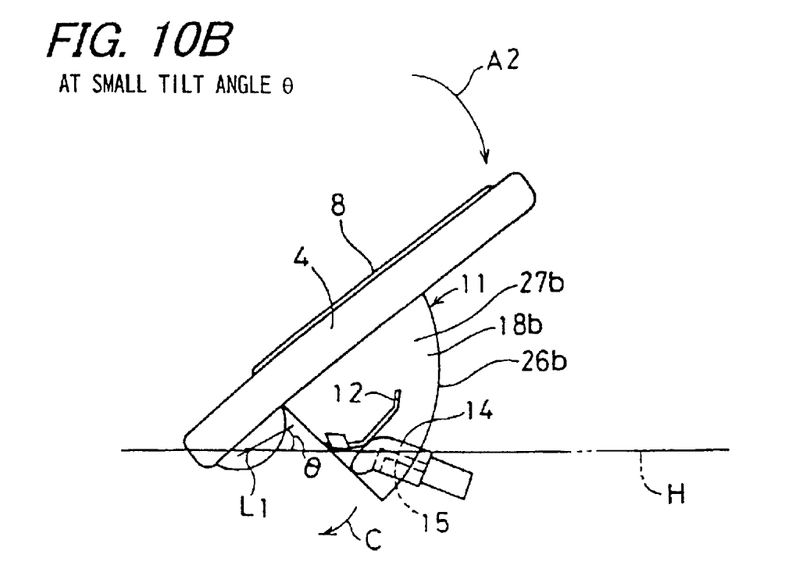

FIGS. 10A and 10B are views illustrating the tilting operation of the panel unit 4, FIG. 10A shows a state of holding the panel unit 4 in the case where the tilt angle θ is large, and FIG. 10B shows a state of holding the panel unit 4 in the case where the tilt angle θ is small. As described above, the friction member 14 is attached to the attachment portion 15 disposed on the telephone body 6, and the slidingly contacting member 11 is disposed on the rear face of the panel unit 4. As shown in FIG. 10A, when the panel unit 4 is angularly displaced with respect to the telephone body 6 about the rotation axis L1 in the opening direction A1, the plate-like members 18a and 18b slide with respect to the friction member 14 in the same direction. At this time, the plate-like members 18a and 18b receive a friction force in a direction C which is opposite to the angular displacement direction A1, from the friction member 14.

Since the friction member 14 is made of a flexible and resilient material, the friction member 14 is elastically deformed by the plate-like members 18a and 18b in accordance with the angular displacement direction A1 and the angular displacement position of the panel unit 4, and the contact area is changed in a reducing direction in accordance with the elastic deformation. With respect to the friction force produced when the panel unit 4 is opened, therefore, the friction force applied on the plate-like members 18a and 18b can be reduced.

In other words, as the tilt angle θ of the panel unit 4 with respect to the horizontal plane H becomes smaller, or as the panel unit becomes more horizontal, the overturning moment in the closing direction A2 and acting on the panel unit 4 is larger. According to this, the contact area is increased, and hence the friction force is increased, so that the tilt holding force can be enhanced. As a result, irrespective of a change of the own weight of the panel unit 4, a resisting moment against the overturning moment which acts on the panel unit 4 can be increased by the simple configuration, so that an adequate tilt holding force can be always applied to the panel unit 4 which is inclined to a desired tilt angle θ.

The friction force which is exerted by the friction member 14 onto the plate-like members 18a and 18b can be set so as to be changed in the following manner. As shown in FIG. 10B, the radii R1 and R2 (see also FIG. 2) of the plate-like members 18a and 18b from the rotation axis L1 to outer peripheries 26a and 26b, and a gap L2 between opposing inner faces 27a and 27b of the plate-like members 18a and 18b are set so as to become smaller as moving toward the downstream side in the direction of the arrow A1, so that the contact area or the pressing force of the plate-like members 18a and 18b with respect to the friction member 14 is more increased as the tilt angle θ of the panel unit 4 with respect to the horizontal plane H becomes smaller. As a result, even when the panel unit 4 is increased in size and weight, the panel unit 4 can be surely held to an arbitrary tilt angle θ, and smoothly angularly displaced.

Since the plate-like members 18a and 18b slidingly contact with the sides 17a and 17b of the friction member 14 to generate the friction force in the direction C which is opposite to the angular displacement direction, the sides 17a and 17b of the friction member 14 can resiliently press the plate-like members 18a and 18b to apply a large static friction force to the members, in a state where the panel unit 4 is maintained to a constant tilt angle θ. When the panel unit 4 is to be angularly displaced, the friction member 14 resiliently presses the inner faces 27a and 27b while being deformed in the movement direction of the plate-like members 18a and 18b, the dynamic friction force generated at this time is smaller than the static friction force, and an adequate tilt holding force at which no slippage due to the own weight of the panel unit 4 occurs can be obtained by a simple configuration.

Since the second slidingly contacting member 12 is a plate spring which resiliently presses the free end 17c of the friction member 14, a plate spring of a spring force which is adequate for the own weight of the panel unit 4 can be selectively employed as the plate spring itself, and an adequate tilt holding force for the own weight of the panel unit 4 can be obtained a simple configuration.

Since the friction member 14 is detachably attached to the attachment portion 15, a work of attaching the friction member during the production process, and attachment and detachment works in replacement due to wear, deterioration, damage, or the like of the friction member can be easily conducted, so that the productivity and the maintainability of the telephone 1 can be improved.

The plate-like members 18a and 18b of the first slidingly contacting member 11 slidingly contact with the sides 17a and 17b of the friction member 14 over the angular displacement range of the panel unit 4, respectively. Even in the state where the panel unit 4 is placed in the angular position where the tilt angle θ is maximum, therefore, the plate-like members 18a and 18b slidingly contact with the sides 17a and 17b of the friction member 14. According to the configuration, when the panel unit 4 is to be attached to and detached from the telephone body 6, the state where the panel unit 4 is placed in the angular position where the tilt angle θ is maximum is maintained, and the fear that, during the attaching or detaching work, the panel unit 4 erroneously drops from the telephone body 6 to be damaged can be reduced to a very low level.

As described above, in the process of producing the telephone 1, the work of attaching the panel unit 4 to the telephone body 6 can be conducted easily, rapidly, and safely. Therefore, the production efficiency of the telephone 1 can be remarkably improved. Also in maintenance of the telephone 1, the works of attaching and detaching the panel unit 4 to and from the telephone body 6 can be conducted easily, rapidly, and safely, so that the efficiency of maintenance of the telephone 1 can be remarkably improved.

In the embodiment, the electronic apparatus is the telephone 1. The electronic apparatus is not restricted to a telephone, and may be any electronic apparatus having a tilt portion which is attachable to and detachable from the electronic apparatus body, and which is angularly tiltable with respect to the body, such as a facsimile apparatus comprising a liquid crystal display device as a tilt portion, a copier, a personal computer, or a vehicle navigation system. In the embodiment, the panel unit 4 comprises the liquid crystal display device 8. The display unit is not limited to a liquid crystal display device, and may be another display unit such as that having a cathode ray tube, or a plasma display device.

In the telephone 1 of the embodiment, the second slidingly contacting member 12 may be configured so as to include a rough-face sheet that is bonded to the plate spring by an adhesive agent, that has a rough sliding face in which the sliding friction force with respect to the friction member 14 is larger than that of the plate spring, and that is realized by, for example, rubber into which cork powder is mixed. According to the configuration, a large friction force can be obtained while sliding wear of the friction member 14 made of silicone rubber can be reduced as far as possible. Moreover, an adequate friction force due to sliding contact between the friction member 14 and the rough-face sheet can be obtained, and edges of the plate spring which are on the side of the friction member 14 can be prevented by the rough-face sheet from directly contacting with the friction member 14, so that the friction member 14 is not shaved nor worn by the edges. As a result, the durability of the friction member 14 is improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic apparatus comprising:
an electronic apparatus body;
a tilt portion disposed on the electronic apparatus body to be angularly diplaceable about a rotation axis over an angular range including a predetermined angular position, the tilt portion being at attachable to and detachable from the electronic apparatus body in a state where the tilt portion is in the predetermined angular position; and
a detachment preventing member detachably attached to the electronic apparatus body, for preventing the tilt portion from being detached from the electronic apparatus body.

2. The electronic apparatus of claim 1, wherein at least one of the electronic apparatus body and the detachment preventing member has positioning piece which positions the tilt portion to the predetermined angular position.

3. The electronic apparatus of claim 1, wherein the detachment preventing member has a resilient engagement piece, and is attached to the electronic apparatus body by resiliently engaging the engagement piece with the electronic apparatus body.

4. The electronic apparatus of claim 1, wherein the tilt portion is a display unit for displaying predetermined information.

5. The electronic apparatus of claim 2, wherein the detachment preventing member has a resilient engagement piece, and is attached to the electronic apparatus body by resiliently engaging th engagement piece with the electronic apparatus body.

6. The electronic apparatus of claim 3, wherein the engagement piece is disposed on one side of the detachment preventing member, and a first latching piece which is to be latched with the electronic apparatus body and a second latching piece which is to be latched with the tilt portion are disposed on another side of the detachment preventing member.

7. The electronic apparatus of claim 5, wherein the engagement piece is disposed on one side of the detachment preventing member, and a first latching piece which is to be latched with the electronic apparatus body and a second latching piece which is to be latched with the tilt portion are disposed on another side of the detachment preventing member.

8. The electronic apparatus of claim 6, wherein, in a state where the second latching piece is latched with the tilt portion the detachment preventing member is angularly displaceable with respect to the electronic apparatus body and the tilt portion between an attachment position where the first latching piece is latched with the electronic apparatus body, and an attachment/detachment operation position where latch of the first latching piece with the electronic apparatus body is cancelled, and, in a state where the detachment preventing member is in the attachment position, the engagement piece is engaged with the electronic apparatus body.

9. The electronic apparatus of claim 7, wherein, in a state where the second latching piece is latched with the tilt portion the detachment preventing member is angularly displaceable with respect to the electronic apparatus body and the tilt portion between an attachment position where the first latching piece is latched with the electronic apparatus body, and an attachment/detachment operation position where latch of the first latching piece with the electronic apparatus body is cancelled, and, in a state where the detachment preventing member is in the attachment position, the engagement piece is engaged with the electronic apparatus body.

10. An electronic apparatus comprising:
an electronic apparatus body;
a tilt portion disposed on the electronic apparatus body to be angularly displaceable about a rotation axis over an angular range including a predetermined angular position, the display unit being attachable to and detachable from the electronic apparatus body in a state where the tilt portion is in the predetermined angular position;
a detachment preventing member detachably attached to the electronic apparatus body, for preventing the tilt portion from being detached from the electronic apparatus body; and
an angular displacement shaft in which an outer diameter is varied with respect to a circumferential direction is formed on one of the electronic apparatus body and the tilt portion; and
a shaft bearing portion is formed on another one of the electronic apparatus body and the tilt portion, the angular displacement shaft being fitted into the shaft bearing portion to be angularly displaceable about the rotation axis, the shaft bearing portion having a cutaway groove of a width which is larger than a minimum outer diameter of the angular displacement shaft and smaller than a maximum outer diameter of the angular displacement shaft, the cutaway groove facing the angular displacement shaft in a direction perpendicular to a direction of the minimum outer diameter in the state where the tilt portion is in the predetermined angular position.

11. The electronic apparatus of claim 10, wherein at least one of the electronic apparatus body and the detachment preventing member has positioning piece which positions the tilt portion to the predetermined angular position.

12. The electronic apparatus of claim 10, wherein the detachment preventing member has a resilient engagement piece, and is attached to the electronic apparatus body by resiliently engaging the engagement piece with the electronic apparatus body.

13. The electronic apparatus of claim 10, wherein the angular displacement shaft has a cylindrical outer peripheral face having a maximum outer diameter over a predetermined angular range in the circumferential direction, and
in the shaft bearing portion, a substantially cylindrical inner peripheral face except the cutaway groove is formed to have an inner diameter which is slightly larger than the maximum outer diameter of the angular displacement shaft.

14. The electronic apparatus of claim 10, wherein the tilt portion is a display unit for displaying predetermined information.

15. The electronic apparatus of claim 11, wherein the detachment preventing member has a resilient engagement piece, and is attached to the electronic apparatus body by resiliently engaging the engagement piece with the electronic apparatus body.

16. The electronic apparatus of claim 12, wherein the engagement piece is disposed on one side of the detachment preventing member, and a first latching piece which is to be latched with the electronic apparatus body and a second latching piece which is to be latched with the tilt portion are disposed on another side of the detachment preventing member.

17. The electronic apparatus of claim 15, wherein the engagement piece is disposed on one side of the detachment preventing member, and a first latching piece which is to be latched with the electronic apparatus body and a second latching piece which is to be latched with the tilt portion are disposed on another side of the detachment preventing member.

18. The electronic apparatus of claim 16, wherein, in a state where the second latching piece is latched with the tilt portion, the detachment preventing member is angularly displaceable with respect to the electronic apparatus body and the tilt portion between an attachment position where the first latching piece is latched with the electronic apparatus body, and an attachment/detachment operation position where latch of the first latching piece with the electronic apparatus body is cancelled, and, in a state where the detachment preventing member is in the attachment position, the engagement piece is engaged with the electronic apparatus body.

19. The electronic apparatus of claim 17, wherein, in a state where the second latching piece is latched with the tilt portion, the detachment preventing member is angularly displaceable with respect to the electronic apparatus body and the display unit between an attachment position where the first latching piece is latched with the electronic apparatus body, and an attachment/detachment operation position where latch of the first latching piece with the electronic apparatus body is cancelled, and, in a state where the detachment preventing member is in the attachment position, the engagement piece is engaged with the electronic apparatus body.

* * * * *